United States Patent Office 3,250,727
Patented May 10, 1966

3,250,727
DEFOAMING AGENTS CONTAINING METHYLSILOXANES
Walter Noll, Leverkusen, and Karl Schnurrbusch, Cologne-Flittard, Germany, assignors to Farbenfabriken Bayer Aktiengesellschaft, Leverkusen, Germany, a German corporation
No Drawing. Filed Dec. 12, 1962, Ser. No. 244,001
Claims priority, application Germany, Dec. 30, 1961, F 35,697
2 Claims. (Cl. 252—358)

The invention concerns the production of aqueous emulsions containing methylpolysiloxane oils which are to be employed as foam-inhibiting additives for aqueous systems.

Such emulsions are known per se, but hitherto there have been difficulties in combining the stability of the emulsion required for the period of storage and transport of a defoaming agent of this type with a high activity during application. Very stable emulsions exhibited unsatisfactory foam inhibition; according to past experience, an emulsion should only exhibit a limited stability in order to produce good effects, by breaking down on dilution, on a change in the pH value, of the electrolyte concentration, or of the temperature in the system to be defoamed and thus to allow formation of the effective siloxane film on the foam micelles. In general, a compromise was therefore arrived at between the two properties, i.e. by waiving the optimum values for defoaming on one hand and for stability on the other.

A process has now been discovered by which it is possible to produce emulsions containing methylpolysiloxane oil so that they are stable and at the same time have foam-inhibiting activity, to an excellent degree. For this purpose, an extremely stabilised emulsion is at first prepared in known manner with vigorous homogenising with the aid of a high emulsifier content, by thoroughly dispersing a mixture of 96–98 percent by weight of an α,ω-bis-(trimethylsiloxy)-polydimethylsiloxane with a viscosity between 300 and 3000 cst. and 4–2 percent by weight of a finely dispersed silicic acid, obtained for instance by the flame hydrolysis of $SiCl_4$, in about half its amount by weight of an emulsifier with a good activity, such as oleyl polygycol ether, and one to ten times its amount by weight of water, with the aid of one of the usual emulsifying devices. For this purpose, rapidly rotating colloid mills and homogenisers are known which operate at strong compression, with the aid of which an extreme stability is achieved by repeated treatment of the emulsion, preferably by the recirculation procedures.

During this operation, it has proved a particular advantage to evaporate the water from the emulsion obtained by repeated treatments, to add an equal amount of water to the residual mixture once more, and to repeat the mechanical treatment in the emulsifying device.

As emulsifiers for the organopolysiloxane oils, nonylphenyl, oleyl and stearyl polyglycol ethers, sorbitol and sorbitan esters which may also be ethoxylated, and mixtures of such products, are particularly suitable. Among them, an oleyl polyglycol ether with about 20 ethylene oxide units per molecule has been found to be particularly active. In agreement with the experience reported at the start, the very stable emulsions obtained by the described method only exhibit a slight foam-inhibiting effect.

According to the invention, an excellent activity as a defoaming agent is now imparted to such an emulsion without impairing its stability by mixing with an amount of between 0.5 and 5 percent by weight of a polyether or of a compound composed of polyether groups and methylpolysiloxane groups, it being of importance that this additional component is added with simple stirring to the already stabilised emulsion and that no steps are taken to subject the mixture thus obtained to an intensive homogenising treatment.

The polyethers which have proved especially useful as additional components according to the invention correspond to the general formula

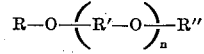

with the following significance:
R is a hydrogen atom or an alkyl radical with less than 7 carbon atoms;
(—R'—O—)$_n$ is a polyether chain with a molecular weight of between 100 and 2000, which has been formed from propylene oxide by itself or from propylene oxide and ethylene oxide, for instance in equal proportions by weight, at random distribution;
R" is a hydrogen atom or an organopolysiloxane radical.

The last mentioned alternative relates to those previously described compounds wherein a methylpolysiloxane is esterified with one of the described polyethers on one or several silicon atoms or is etherified with the polyether via an alkylene-oxygen bridge, particularly a methylene-oxygen bridge. The first mentioned esterification products have been known for some time; a process for their production has for example been described in United States Patent 2,834,748. The last mentioned etherification products and their production are for instance described in French Patent 1,290,552.

The activity of the specified additional components in the emulsions prepared according to the invention could not be expected owing to the behaviour exhibited by these compounds when applied on their own. Although the siloxane-esterfied polyethers have already been recommended as foam preventing agents, they in fact prove to be just as inactive as the others, particularly in those systems which contain the very important wetting agents such as alkyl sulphonates, alkyl suphates, and polglycol ethers, as will be explained at the end of the following examples. Therefore, the synergistic effect resulting from the combination according to the invention of a stock emulsion having little activity of its own with the polyethers which also have an insufficient defoaming activity on their own is even more surprising.

The following examples are given for the purpose of illustrating the invention.

Example 1

3 g. of a commercial finely divided silicic acid, obtained by flame hydrolysis of $SiCl_4$, is suspended in 77 g. of α,ω-bis-(trimethylsiloxy)-polydimethylsiloxane with a viscosity of about 1400 cst. (20° C.), this suspension is added to a solution of 40 g. of an oleyl polygycol ether, formed from approximately 20 ethylene oxide units per molecule, in 80 g. of water, and the mixture is dispersed in a homogenising machine by a recirculation procedure. The product is heated until the water has been evaporated from it, 80 g. of water are added once more, and the mixture is again subjected to the same treatment as before in the homogenising device.

The emulsion prepared by this method, termed "stock emulsion" in the subsequently described evaluation experiments, has an excellent stability but does not yet constitute a satisfactory foam preventing agent. In order to obtain such an agent, 3 percent by weight of a polyether of the formula

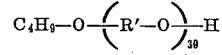

wherein the polyether chain (—R'—O)$_{30}$ had been formed from equal proportions by weight of ethylene oxide and propylene oxide (mol. weight approximately 1900) are added to the emulsion with stirring.

The foam inhibiting activity of the emulsions with and without the polyether addition according to the invention can be tested by the following method:

A three-necked flask is fitted with a reflux condenser, a thermometer, and a glass tube which is open at its upper end and closed by a rough glass sinter at its lower end, which eventually dips into the liquid contents. A mixture of 250 cc. of water, 1 cc. of an aqueous solution containing 10 percent by weight of an alkyl sulphonate employed commercially as a wetting agent, and 0.5 cc. of a dilution of the emulsion under test at any one time containing 0.4 percent by weight of methylsiloxane are added to the flask. The flask is heated by stages to 25, 50, and 70° C., and at each of these temperatures air is aspirated from the flask by the method of applying at the suction point of the flask a pressure reduction equivalent to a water column of height 100 mm. for one minute, whilst external air bubbles through the liquid via the glass sinter of the submerged tube. The time interval T between the interruption of aspiration and the instant at which the foam cover to be observed is so far split that an area of at least approximately 1 cm.$^2$ becomes visible on the liquid surface is then measured with a stopwatch.

The time T measured like this amounted to 5 seconds at 25° C.
20 seconds at 50° C.
80 seconds at 70° C.

in a mixture which in addition to water and wetting agent also contained the previously described stable emulsion in the condition at which it is withdrawn from the homogenising device, i.e. the stock emulsion without the polyether addition according to the invention.

By contrast, T was practically equal to zero at 25, 50, and 70° C. after mixing in the emulsion prepared according to the invention, i.e. with the emulsion treated with the described polyether.

*Example 2 to 7*

A stock emulsion is at first prepared by the method as described in paragraph 1 of Example 1. In order to complete the defoaming agent, use is made of the polyethers specified in the following table at the proportions stated in column 2 (percent by weight, referred to the stock emulsion).

*Example 8*

3 percent by weight of a polyglycol-polysiloxane mixed ether of the formula

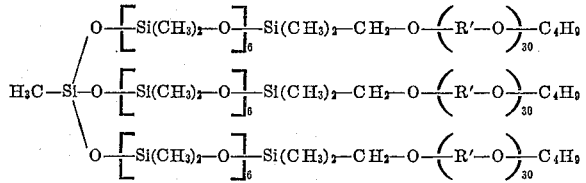

wherein, as in Example 1, the polyglycol ether chain (—R'—O—)$_{30}$ is formed from equal parts by weight of ethylene oxide and propylene oxide, are added to the stock emulsion according to Example 1.

During the test described in Example 1, T at 25, 50, and 70° C. was again equal to zero.

*Examples 9 and 10*

The same result is achieved by adding to the stock emulsion according to Example 1, with stirring, either 3 percent by weight of a polyglycol ether polysiloxane ester of the formula

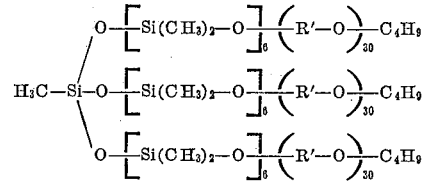

with the same significance for (—R—O—)$_{30}$ as before, or 3 percent by weight of an ester of the formula

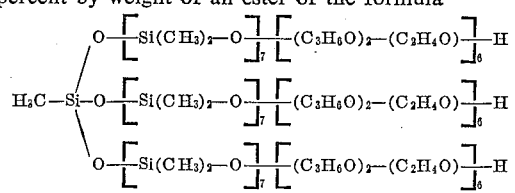

As has already been mentioned, the polyether compounds employed as additional component according to the invention do not cause any reduction in foam on their own, at least in the aqueous systems mentioned. This is easily demonstrated by adding only 0.5 cc. of a solution in water of 0.4 percent by weight of one of the polyether-polysiloxane compounds according to Examples 8 and 9 to the solution of the wetting agent employed in the previously described experiments instead of the specified defoaming emulsions. No defoaming activity whatever is observed even after a waiting period of $T=300$ seconds.

| | Polyether | Percent | T/seconds at— | | |
|---|---|---|---|---|---|
| | | | 25° C. | 50° C. | 70° C. |
| (2) | HO—[(C$_3$H$_6$O)$_2$—C$_2$H$_4$O]$_5$—H | 3 | 0 | 0 | 0 |
| (3) | HO—(C$_3$H$_6$O—C$_2$H$_4$O)$_7$—H | 3 | 0 | 0 | |
| (4) | Polypropylene glycol monomethyl ether of mol. weight 680. | 3<br>6 | 0<br>0 | 0<br>0 | 26<br>0 |
| (5) | HO—[(C$_3$H$_6$O)$_2$—C$_2$H$_4$O]$_6$—H | 3<br>6 | 0<br>0 | 12<br>0 | 0 |
| (6) | Polypropylene glycol of mol. weight 1,000. | 3<br>6 | 4<br>0 | 0 | 0 |
| (7) | HO—(C$_3$H$_6$O)$_4$—H | 3<br>6 | 0<br>0 | 5<br>0 | 45 |

We claim:
1. In a process for the manufacture of a stable aqueous antifoam emulsion by emulsifying a mixture of 96–98 percent by weight of α,ω-bis-(thimethylsiloxy)-polydimethylsiloxane with a viscosity of between 300 and 3000 centistokes and 4 to 2 percent by weight of finely divided silica with approximately half its amount by weight of a nonionic emulsifier selected from the group consisting of polyoxyethylated nonylphenol, oleyl alcohol and stearyl alcohol, and with one to ten times its amount by weight of water, thereby forming a stock emulsion, the step which comprises admixing with the said stock emulsion, by moderate stirring, 0.5 to 5 percent by weight of a siloxane polyether of the formula

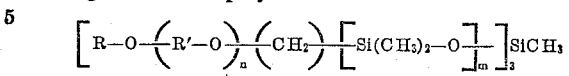

wherein R denotes a member selected from the group consisting of a hydrogen atom and an alkyl radical with less than 7 C atoms, $(-R'-O-)_n$ is a polyether chain with a molecular weight of between 100 and 2000 composed of propylene oxide and ethylene oxide in a molar ratio of from 2:1 to 3:4, and $m$ is an integer of about the range of 6 and 7.

2. A stable emulsion with a strong defoaming activity in aqueous systems, combined by simple mixing of (1) a stock emulsion prepared from a mixture of 96 to 98 percent by weight of α,ω-bis-(trimethylsiloxy)-polydimethylsiloxane with a viscosity of between 300 and 3000 centistokes and 4 to 2 percent by weight of finely divided silica in approximately half its amount by weight of a non-ionic emulsifier selected from the group consisting of polyoxyethylated nonylphenol, oleyl alcohol and stearyl alcohol, and 1 to 10 times its amount by weight of water, with (2) 0.5 to 5 percent by weight, referred to the stock emulsion (1), of a polyether selected from the group consisting of siloxane polyethers of the formula

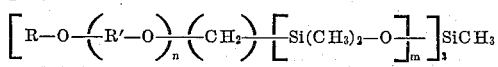

wherein R denotes a member selected from the group consisting of a hydrogen atom and an alkyl radical with less than 7 C atoms, $(-R'-O-)_n$ is a polyether chain with a molecular weight of between 100 and 2000 composed of propylene oxide and ethylene oxide in a molar ratio of from 2:1 to 3:4, and $m$ is an integer about the range of 6 and 7.

References Cited by the Examiner
UNITED STATES PATENTS

| | | | |
|---|---|---|---|
| 2,575,276 | 11/1951 | Jacoby et al. | 252—358 |
| 2,575,298 | 11/1951 | Ryznar | 252—358 |
| 2,595,928 | 5/1952 | Currie et al. | 252—358 |
| 2,753,309 | 7/1956 | Figdor | 252—321 |
| 2,829,112 | 4/1958 | Solomon | 252—358 |
| 2,834,748 | 5/1958 | Bailey et al. | |
| 2,846,458 | 8/1958 | Haluska | 252—351 |
| 2,894,913 | 7/1959 | Sullivan et al. | 252—358 |
| 3,076,768 | 2/1963 | Boylan | 252—321 |
| 3,113,930 | 12/1963 | Chevalier | 252—358 |

ALBERT T. MEYERS, *Primary Examiner.*

JULIUS GREENWALD, *Examiner.*

H. B. GUYNN, *Assistant Examiner.*